US007631118B2

(12) United States Patent
Renaud et al.

(10) Patent No.: US 7,631,118 B2
(45) Date of Patent: Dec. 8, 2009

(54) LANE TO LANE DESKEWING VIA NON-DATA SYMBOL PROCESSING FOR A SERIAL POINT TO POINT LINK

(75) Inventors: Lyonel Renaud, Gilbert, AZ (US); David M. Puffer, Tempe, AZ (US); Sarath Kotamreddy, Chandler, AZ (US); Daren J. Schmidt, Chandler, AZ (US); Suneel G. Mitbander, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1276 days.

(21) Appl. No.: 10/749,721

(22) Filed: Dec. 31, 2003

(65) Prior Publication Data

US 2005/0141661 A1 Jun. 30, 2005

(51) Int. Cl.
*G06F 3/00* (2006.01)
*G06F 13/00* (2006.01)
(52) U.S. Cl. .............................. 710/52; 710/33; 710/54
(58) Field of Classification Search ........................ None
See application file for complete search history.

(56) References Cited

U.S. PATENT DOCUMENTS

| 6,009,488 | A | 12/1999 | Kavipurapu |
| 6,654,824 | B1 | 11/2003 | Vila et al. |
| 7,295,639 | B1 * | 11/2007 | Cory ............................ 375/371 |
| 2002/0112099 | A1 * | 8/2002 | Collier .......................... 710/1 |
| 2002/0138675 | A1 | 9/2002 | Mann |
| 2003/0099260 | A1 | 5/2003 | Bunton |

OTHER PUBLICATIONS

Ravi Budruk, et al., "PCI Express System Architecture", PC System Architecture Series, MindShare, Inc., Addison-Wesley copyright 2004, ISBN #0-3212-15630-7 (Contents, pp. vii-xxxvii; Part Three The Physical Layer—Chapter 11 Physical Layer Logic, pp. 397-451; and Link Initialization and Training Overview, pp. 500-552).
"PCI Express™ Base Specification Revision 1.0a", Apr. 15, 2003 (Incorporated Errata C1-C67 and E1-E4.17) PCI Express (Contents, pp. 3-8; and Chapter 4-4. Physical Layer Specification, pp. 151-201).
PCT International Search Report, dated May 18, 2005 (International Application No. PCT/US2004/043526—International Filing Date Dec. 22, 2004) (12 pgs.).

* cited by examiner

*Primary Examiner*—Tariq Hafiz
*Assistant Examiner*—Scott Sun
(74) *Attorney, Agent, or Firm*—Blakely, Sokoloff, Taylor & Zafman LLP (57) ABSTRACT

Multiple symbol sequences that have been transmitted in parallel using the same transmit clock over a serial point to point link are received. Each symbol sequence includes an instance of a first, non-data symbol. The multiple symbol sequences are buffered and the number of times an instance of a second, non-data symbol that occurs in one of the symbol sequences is changed. A first deskew process is performed, followed by a second deskew process. The first deskew process aligns an instance of the first non-data symbol in every one of the buffered symbol sequences. The second deskew process equalizes the number of instances of the second non-data symbol that follow an instance of the first non-data symbol in every one of the symbol sequences. Other embodiments are also described and claimed.

22 Claims, 10 Drawing Sheets

LANE TO LANE DESKEWING VIA NON-DATA SYMBOL PROCESSING FOR A SERIAL POINT TO POINT LINK

BACKGROUND

An embodiment of the invention is generally related to serial, point to point interconnect technology suitable for communicatively coupling elements of an electronic system, and particularly to those which have certain aspects that are in accordance with the PCI Express Base Specification 1.0a (Errata dated 7 Oct. 2003) ("PCI Express"). Other embodiments are also described.

An electronic system is composed of several elements that are designed to communicate with one another over an input/output (I/O) interconnect of the system. For instance, a modern computer system may include the following elements: a processor, main memory, and a system interface (also referred to as a system chipset). An element may include one or more integrated circuit (IC) devices. For example, the system chipset may have a memory controller hub (MCH) device that allows the processor to communicate with system memory and a graphics element. In addition, an I/O controller hub (ICH) device may be provided that connects the processor and memory, via the MCH, to other elements of the computer system such as mass storage devices and peripheral devices. In that case, a separate, point to point link such as one defined by PCI Express may be used to allow bi-directional communication between a pair of devices, e.g. the processor and the MCH, the MCH and the graphics element, and the ICH and the mass storage device.

A PCI Express point to point link may have one or more lanes that can operate simultaneously. Each lane has dual, unidirectional paths, which are also simultaneously operable. Each path may have a single set of transmitter and receiver pairs (e.g., a transmitter in a port of Device A, a receiver in a port of Device B). In that case, the transmitter and receiver may drive and sense a transmission medium such as a pair of metal traces in a printed wiring board that may traverse a board-to-board connector. Alternatively, other transmission media may be provided, such as optical fiber.

A point to point link serves to transport various types of information between devices. At a so-called "higher layer", however, communications between peers in two devices (also referred to as a requester and a completer) may be conducted using transactions. For example, there are memory transactions that transfer data to or from a memory-mapped location. Under PCI Express, there are also message transactions that communicate miscellaneous messages and can be used for functions like interrupt signaling, error signaling, and power management.

There may be three abstract layers that "build" a transaction. The first layer may be the Transaction Layer, which begins the process of turning a request or completion data coming from a device core into a data packet for a transaction. The second architectural build layer is called the Data Link Layer; it ensures that packets going back and forth across a link are received properly (via techniques such as error control coding). The third layer is called the Physical Layer. This layer is responsible for the actual transmitting and receiving of the packet across the link. The Physical Layer in a given device interacts with its Data Link Layer (in the same device) on one side, and with the metal traces, optical fiber, or other transmission medium that is part of the link, on another side. The Physical Layer may contain circuitry for the transmitters and receivers, parallel to serial and serial to parallel converters, frequency and phase control circuits, and impedance matching circuitry. It may also contain circuitry for logic functions needed for its initialization and maintenance. A layered architecture may permit easier upgrades by, for example, allowing reuse of essentially the same Transaction and Data Link Layers, while upgrading the Physical Layer (e.g., increasing transmit and receive clock frequencies).

An example of the behavior of the Physical Layer is now given. Once power up occurs, the Physical Layers on both Device A and Device B are responsible for initializing the link and making it ready for transactions. This initialization process may include determining how many lanes should be used for the link, and at what data rate the link should operate. Sometime after the link is properly initialized, a memory read request is initiated in Device A. Eventually, a packet that includes this read request arrives at Device A's Physical Layer, including headers, error control information, and sequence numbers added by the higher layers. The Physical Layer then takes this packet of data and transforms it into a serial data stream (perhaps after adding framing data to it), and transmits the stream using, for example, an electrical, differential signal having predefined timing rules.

Once the Physical Layer in Device B sees the signal appear at its receiver input, it samples the signal to recover the data stream, and builds the stream back into a data packet (e.g., after removing the framing). The packet is then passed up to the Data Link Layer in Device B, which strips the headers and checks for errors; if there are no errors, the packet is passed up to the Transaction Layer where the memory read request is extracted and then sent to the appropriate logic function to access the locations specified in the request.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
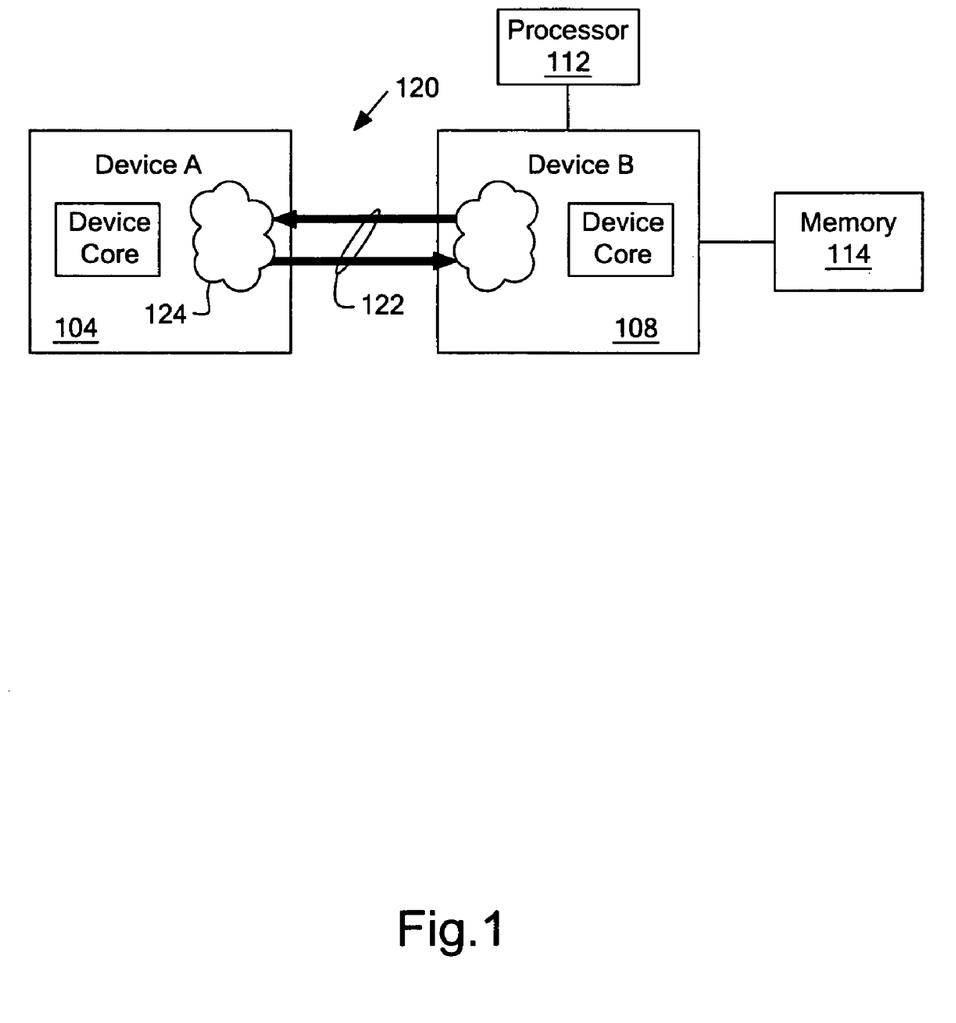
FIG. 1 illustrates a pair of integrated circuit devices that are coupled to each other via a serial point to point link.

An embodiment of the invention is directed to receiver deskewing of multiple lanes of a serial, point to point link. FIG. 1 illustrates a pair of integrated circuit devices that are coupled to each other via a serial point to point link. The IC devices 104 (Device A) and 108 (Device B) may be part of a computer system that contains a processor 112 and main memory 114. In this example, a serial point to point link 120 is used to communicatively couple the core of Device B with that of Device A. The link 120 has dual, unidirectional paths 122, with link interface 124 that serves to interface with the device core of each respective Device A and B.

In this embodiment, Device B is referred to as the root complex of the computer system and provides the processor 112 with I/O access to, for instance, a graphics element in Device A. The root complex may be partitioned into a graphics and memory controller hub (GMCH) and an I/O controller hub (ICH). The ICH would act as a further interface between the GMCH and other I/O devices of the system, including a non-volatile mass storage device, a pointing device such as a track pad or mouse, and a network interface controller (not shown). The point to point link 120 may be duplicated for communicatively coupling the Device B to the processor 112 and the main memory 114. Other platform architectures that feature the point to point link 120 are also possible.

Figure 2:
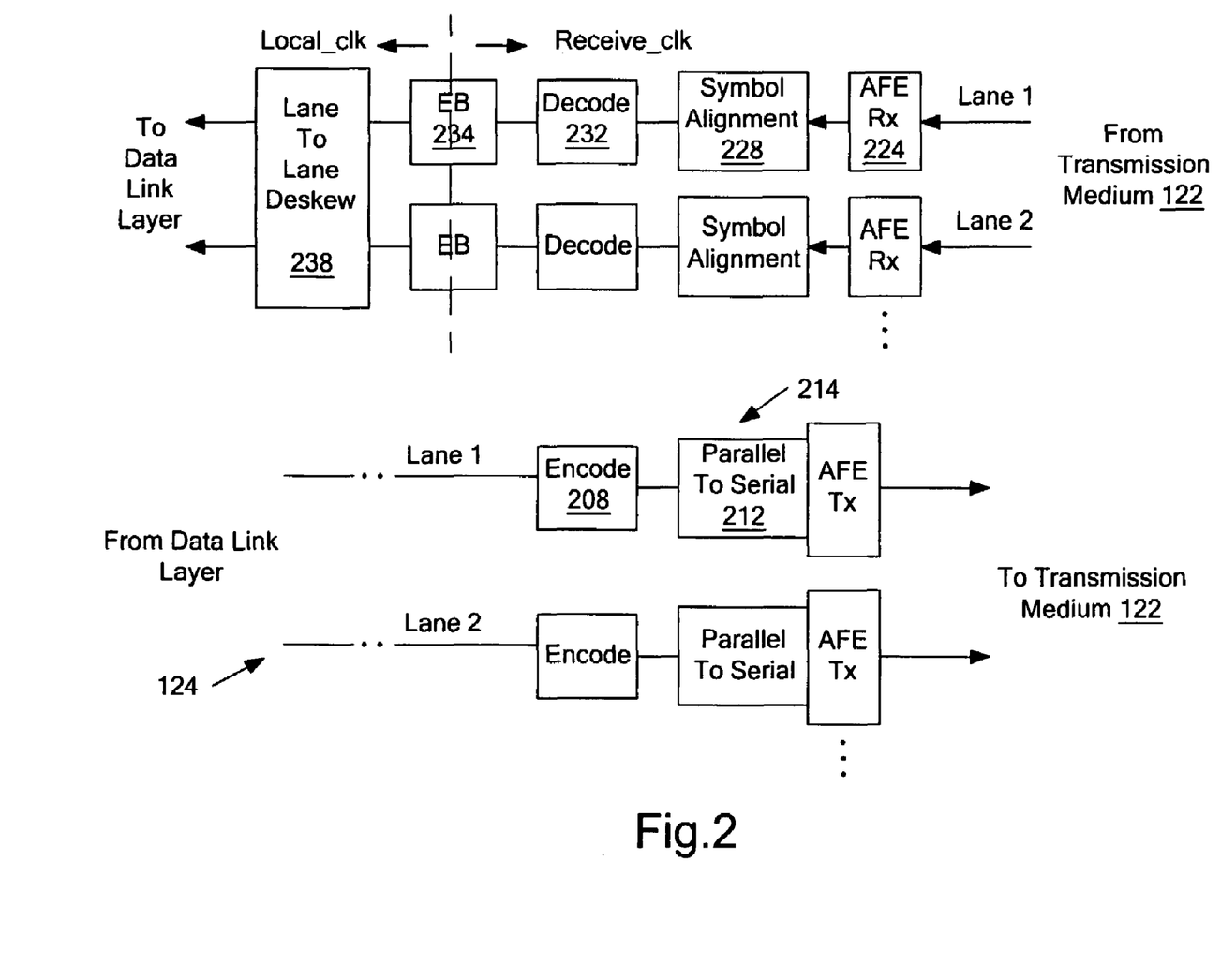
FIG. 2 shows a block diagram of part of the link interface circuitry used to implement the serial point to point link in an integrated circuit device.

The interface 124 of FIG. 1 may be viewed as implementing the multiple layer architecture (described above in the Background) for a serial point to point link. Some details of the interface 124 are illustrated in FIG. 2. The interface 124 supports independent transmit and receive paths between the transmission medium 122 and the Data Link Layer of its respective device 104, 108. In the transmit path, information in the form of data packets arrive from the Data Link Layer and are divided into symbols that are encoded by an encode block 208. A purpose of the encoding by block 208 is to embed a clock signal so that a separate clock signal need not be transmitted into the transmission medium 122. This encoding may be the well known 8B-10B where an eight bit quantity is converted into a 10 bit quantity; other encoding schemes are possible. In some cases, such as where a separate strobe or clock signal is transmitted in the medium 122, there may be no need for such encoding.

Following encoding in block 208, the units of data (referred to here as symbols) are processed by a parallel to serial block 212 of an analog front end (AFE) transmit block 214 to yield a stream of bits. Note that a "bit" as used here may represent more than two different states, e.g. a binary bit, a ternary bit, etc. The term "bit" is used merely here for convenience and is not intended to be limited to a binary bit. The bit stream is then driven into the transmission medium 122. As explained above in the Background, this transmission medium may be a pair of metal traces formed in a printed wiring board. Other forms of the transmission medium 122 may alternatively be used, such as an optical fiber.

The series of blocks 208-214 may serve a single lane of the point to point link 120 (FIG. 1). In general, there may be more than one lane in the point to point link 120, so that a packet received from the Data Link Layer may be "striped" across multiple lanes for transmission.

Turning now to the receive side of the interface 124 shown in FIG. 2, each lane has its associated AFE receive block 224, which serves to receive a stream of information from the transmission medium 122, by for example sampling a signal in the transmission medium 122. The AFE receive block 224 translates between signaling of the transmission medium 122 and signaling of the IC device 104 (e.g., on-chip, complementary metal oxide semiconductor, CMOS, logic signaling). As will be explained below, the stream of information represents sequences of M-bit symbols (where M is an integer greater than 1) that have been transmitted by the Device B over the serial point to point link 120 (see FIG. 1).

The stream of bits provided by the AFE receive block 224 is fed to symbol alignment logic 228 which serves to align or lock onto the symbols that have been received. In other words, and as will be explained below, the symbol alignment logic 228 will demarcate the correct symbol boundaries within the received bit stream, for use by subsequent sections of the Physical Layer in the device 104.

The symbol-aligned bit stream may then be fed to decode block 232 which undoes the encoding performed by encode block 208 (e.g., 10B-8B decoding, to yield symbols of information consisting of eight binary bits each).

The decoded symbols are then fed to an elastic buffer, EB 234. The EB 234 serves to compensate for any differences in the tolerance of the rate at which the symbols were transmitted in Device B and a local clock signal (local_clk) of Device A. The local_clk is used to unload symbols from the EB 234, as well as in some cases operate parts of lane to lane deskew circuitry 238 as explained below (in the case where the link 120 is composed of more than one lane). It should be noted that the decode block 232 (if provided) may be placed further downstream, e.g. at the output of the EB 234 or at the output of the deskew circuitry 238.

The unload pointer of the EB 234 may be managed to avoid overflow and underflow conditions in the elastic buffer, using predefined, special or non-data sequences of symbols that have been inserted into a data sequence, by the Device B (see FIG. 1). Briefly, to prevent underflow of the elastic buffer, the unload pointer may be stalled at an entry of the buffer that contains a non-data symbol, in response to detecting the non-data sequence. This is done while unloading the data sequence according to the changing unload pointer. This causes the load pointer to move away from the unload pointer and thereby avoid underflow.

On the other hand, to prevent overflow of the elastic buffer, the unload pointer may be changed by more than one entry so that a non-data symbol of the non-data sequence (as it is presently loaded in the buffer) is skipped, while symbols are being unloaded from the buffer. Once again, this is done in response to detecting the non-data sequence. This causes the unload pointer to move away from the load pointer, again to avoid a collision.

A symbol may be a "data" symbol that represents some payload that has been sourced by the Data Link Layer, Transaction Layer or some other higher layer such as the device core. Alternatively, a symbol may be a "non-data" symbol, e.g. a special symbol generated by one of the Physical, Data Link, or Transaction Layers, to achieve some type of control over the information that is being transmitted over the serial point to point link. Several examples of such non-data symbols will be given below as PCI Express special symbols.

PCI Express defines a number of special symbols that are added to the packets that are being communicated. For instance, special symbols may be added to mark the start and stop of a packet. This is done to let the receiving device know where one packet starts and where it ends. Different special symbols are added for packets that originate in the Transaction Layer than in the Data Link Layer. In addition, there is a special symbol called "SKP" (skip) which is to be used by the Physical Layer for compensating for small differences in the operating data rates of two communicating ports. There is also a special symbol called "COM" (comma) that is to be used for lane and link initialization by the Physical Layer.

Deskew

The problem of deskew as addressed here relates to links that have more than one lane. In essence, deskew is a problem because the "flight time" of information as it is transmitted from Device B and received at Device A may vary from lane to lane. Thus, although a set of symbols may be transmitted simultaneously on a corresponding set of lanes by Device B, using the same transmit clock, they cannot be expected to arrive at Device A at essentially the same time, i.e. without lane to lane skew. There may be several different sources for the lane to lane skew. These include, for the case where the Physical Layer transmission medium is as defined in PCI Express, on-chip differential drivers and receivers, printed wiring board impedance variations, and lane wire mismatches. Variable delays may also be injected by the serialization and deserialization logic.

Figure 3:
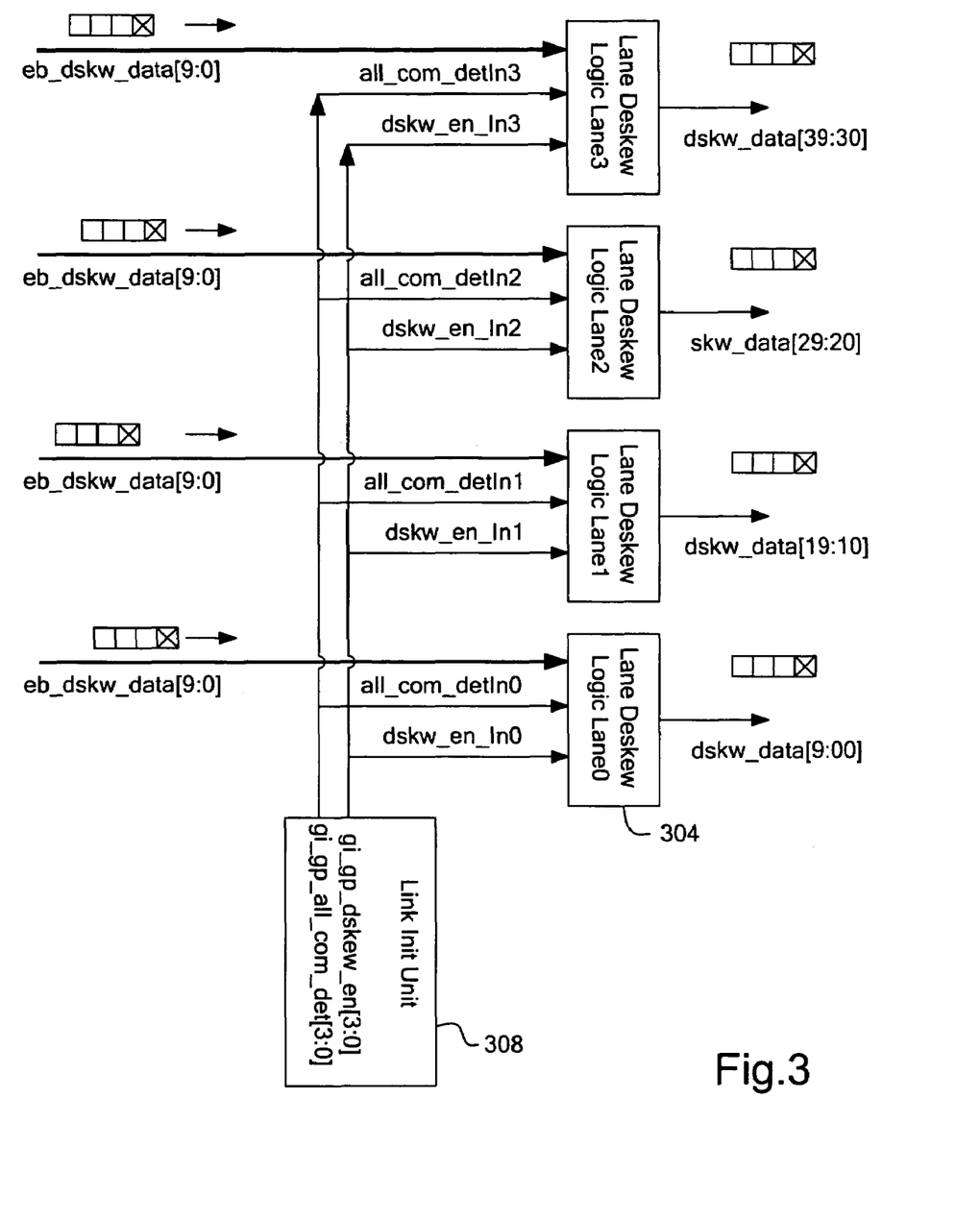
FIG. 3 depicts a block diagram of deskew circuitry for servicing in this example a link having four lanes.

Because a packet may be striped across multiple lanes, any lane to lane skew should be minimized to help ensure that the striped packet is received and processed correctly at the receiver device. Otherwise, if symbols that have been transmitted simultaneously arrive at the receiver at different times, and are then deserialized to reconstruct a packet of data, such a packet would be most likely completely incomprehensible to the Data Link layer. Under PCI Express, predefined, non-data sequences referred to as "TS1/TS2 Ordered-Sets" may be used to determine the amount of misalignment or skew between the lanes of a given link. FIG. 3 illustrates conceptually how four sets of a four-symbol sequence that were transmitted "simultaneously" arrive in parallel but at different times in the receiver, and are subsequently aligned by the deskew circuitry.

According to an embodiment of the invention, lane to lane deskewing may be achieved via non-data symbol processing, as described below. First, two or more symbol sequences are received in parallel in Device A, where these sequences have been transmitted by Device B over the serial point to point link (see FIG. 2). Each symbol sequence includes an instance of a first non-data symbol (e.g., the PCI Express COM). The symbol sequences are buffered to compensate for the tolerances allowed for the transmit clock of Device B and the receive clock of Device A. Referring again back to FIG. 2, such buffering may be accomplished by the elastic buffer (EB) 234. This buffering, however, may also cause a change in the number of times an instance of a second non-data symbol (e.g., PCI Express SKP) occurs in a given symbol sequence. Thus, in addition to the standard sources of skew mentioned above, the action of the EB 234 may induce further lane to lane skew.

An embodiment of the invention is directed to a two part deskew process. The first part aligns an instance of the first non-data symbol in every one of the buffered symbol sequences of the link. This process results in a certain adjustment in the delays that are presented to each sequence, by the buffering effect of the deskew logic. Once this part is complete, the second part may be invoked to equalize the number of instances of the second non-data symbol that follow an instance of the first non-data symbol (in every one of the symbol sequences). An example using special symbols defined under PCI Express will now be described. It should be noted that other types of non-data symbols, including different first and second non-data symbols, may be used to achieve the deskew described here. In addition, either of these first and second parts of the deskew process may be used separately, or in combination with other symbol processing, to achieve reliable multi-lane communications for a serial point to point link.

Beginning with FIG. 3, this figure shows a block diagram of deskew circuitry for servicing in this example a link having four lanes. Each is receiving 10-bit symbols from the EB 234 (see FIG. 2). Although these are shown as 10-bit symbols, the embodiment of FIG. 2 may actually provide 8-bit symbols because of the presence of the decode block 232. Other symbol sizes are alternatively possible.

Each lane has its own lane deskew logic 304 which receives its respective symbol sequence. In addition, the lane deskew logic 304 receives control signals from a portion of a link initialization unit 308 that may act as a supervisor for the deskew process. These control signals include: a deskew enable control signal (per lane); and a control signal that indicates that the first non-data symbol has been detected on all lanes of the link (all_com_det). Each instance of the lane deskew logic 304 also provides at its output its respective, forwarded symbol sequence (with reduced skew).

Figure 4A:
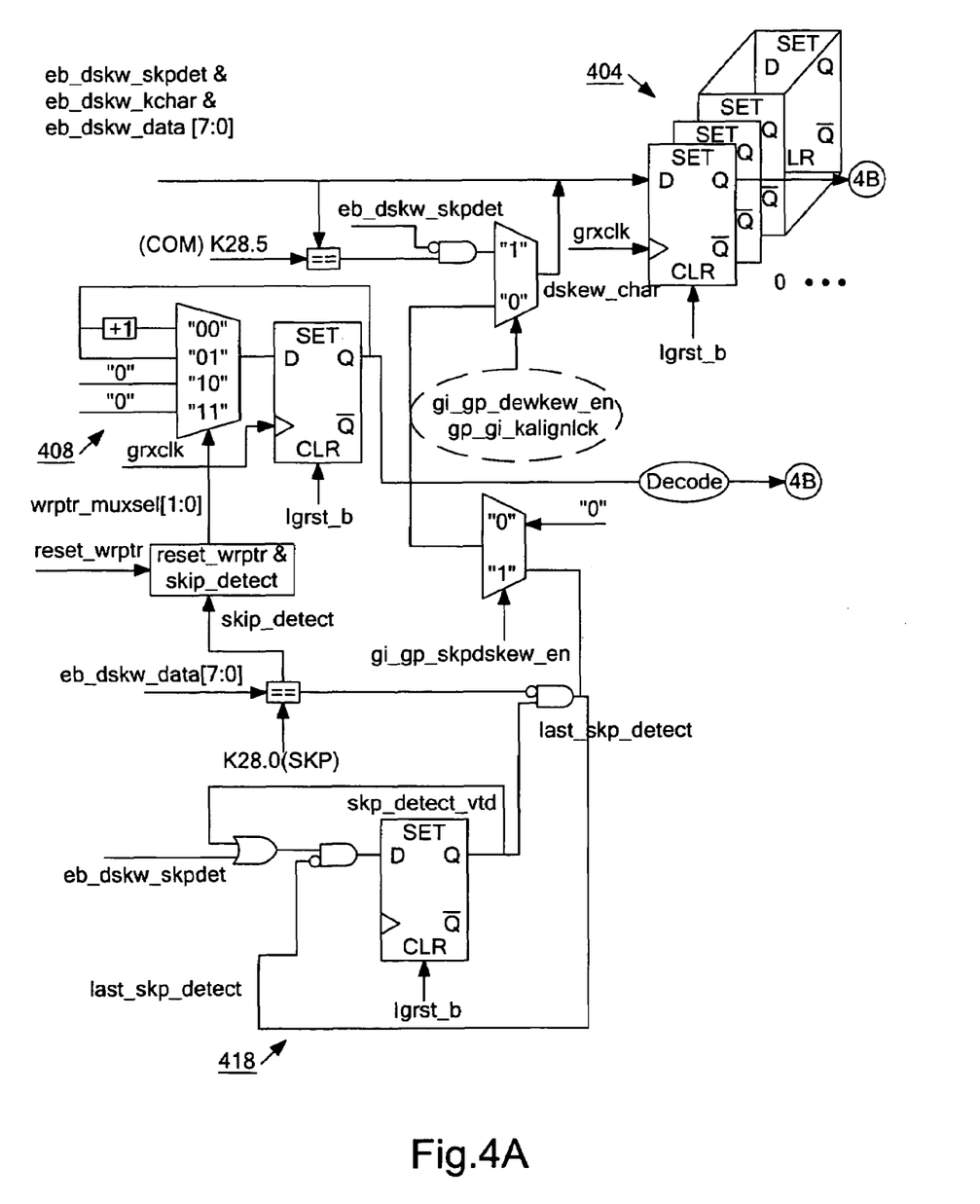
FIGS. 4A-4B show a detailed block diagram of example deskew circuitry for a single lane.
Figure 4B:
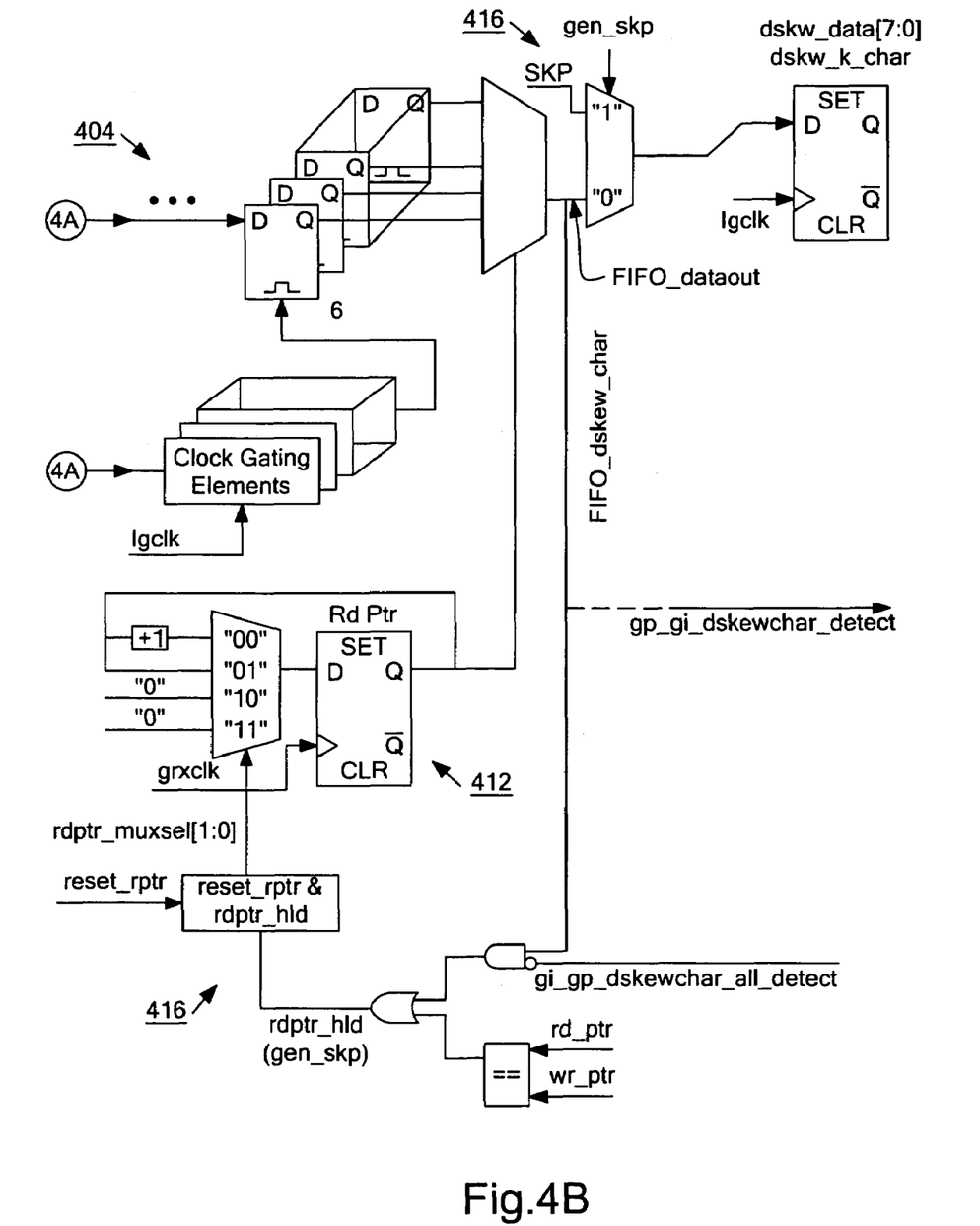

According to an embodiment of the invention, the lane deskew logic may be implemented by the hardware shown in FIGS. 4A-4B. A deskew buffer 404 (which may have a first in first out structure, also referred to as a queue) is provided with a depth of in this example seven entries (0, 1, . . . 6). The depth of the buffer 404 should be selected in view of an upper limit on the allowable skew provided in a design specification for the link. The same buffer 404 may be used for both the first and second deskew processes.

Still referring to FIG. 4A, write pointer logic 408 is designed to load a buffered, symbol sequence into the deskew buffer 404. In the first part of the deskew process, the value of the write pointer is changed or updated sequentially according to the local clock, lgclk, which is also used to read the buffered symbols out of the EB 234 (see FIG. 2). Note that the write pointer may be incremented, that is changed by one entry, for each cycle of lgclk, under normal circumstances, as well as during the first part of the deskew process, even when the read pointer as described below has been stalled. However, in the second part of the deskew process, the write pointer is controlled such that the second non-data symbol (e.g. SKP) may never be written into the buffer. The second non-data symbol is the one that is substituted when the read pointer is stalled (during the first part of the deskew process). Avoiding the actual writing of the second non-data symbol to the buffer (during the second part) helps avoid an eventual buffer overflow condition.

FIG. 4B shows read pointer logic 412 that provides a read pointer, to unload the buffered, symbol sequence from the deskew buffer 404. For example, the read pointer is incremented according to each cycle of lgclk unless the first non-data symbol (e.g., COM) appears at the outlet of the buffer 404.

The deskew circuitry shown in FIG. 4B also includes control logic 416 that is coupled to the read pointer logic 412. The logic may be activated once the enable control signal gi_gb_dskew_ (as well as perhaps an indication that symbol alignment has occurred, namely via gp_gi_kalignlck) has been asserted. In response to the first instance of the first non-data symbol (e.g., COM) appearing at an outlet of the buffer 404, the control logic 416 can stall the read pointer, in this example through selection of the "01" input of a multiplexer as shown. In addition, control logic 416 can generate an instance of the second non-data symbol (e.g., SKP) at an output of the lane deskew logic through which the buffered symbol sequence dskw_data[7:0] is forwarded. The control logic 416 may release the read pointer (and stop generating instances of the second non-data symbol) once the first non-data symbol has appeared at an output of the deskew buffer 404 in every lane of the link.

Figure 5:
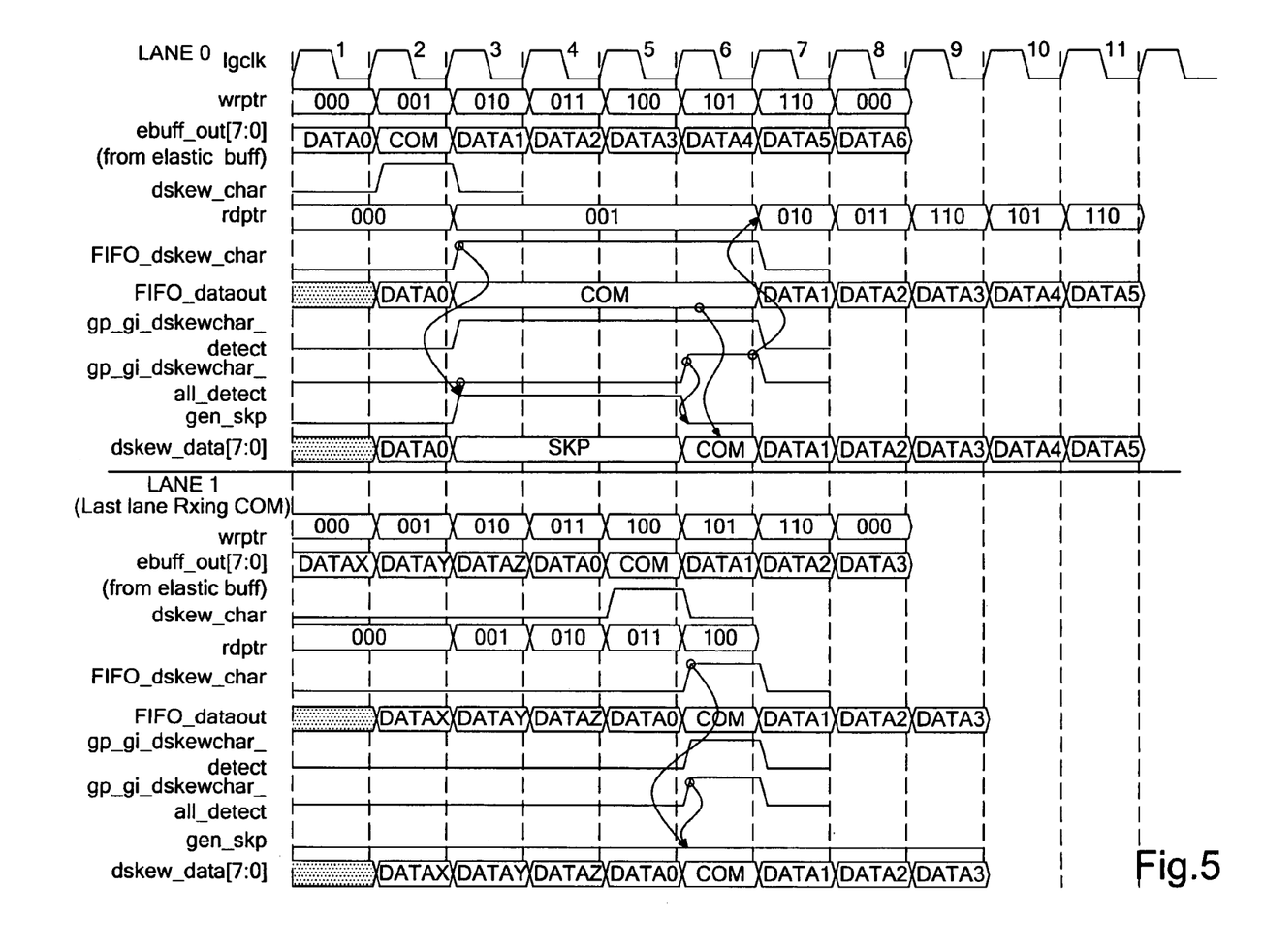
FIG. 5 is an example timing diagram that illustrates a deskew process.

Operation of the first part of the deskew process, using the hardware of FIGS. 4A-4B as an example, is depicted in the timing diagram of FIG. 5. This timing diagram shows waveforms associated with two different lanes of the link where lane 0 may be the first one to receive the first non-data symbol COM and lane 1 is the last lane to receive a COM.

Note how the write pointer wrptr is incremented in each cycle of lgclk (and wraps around to 0 in cycle 8). The inlet of the buffer 404 is represented by ebuff_out[7:0] while its output is represented by FIFO_dataout. The indication dskew_char is a flag that also arrives at the inlet of the buffer 404 (from the EB 234, see FIG. 2). This flag is aligned with the arriving COM symbol as seen in cycle 2.

When this COM is detected at the outlet of the buffer 404, and in particular in cycle 3, the FIFO_dskew_char flag is asserted which immediately causes the gen_skp flag to also be asserted. This means that the rdptr is stalled at its present value of 001, while an instance of the second non-data symbol SKP is generated (beginning with cycle 3) in dskw_data[7:0]. The situation in cycle 3 continues until the last lane of the link has received a COM at the inlet of its buffer 404. Thus, referring now to the timing diagram for lane 1, this lane is the last lane that has receive a COM which happens to be in cycle 5 of lgclk. This occurrence is then decoded such that in the next cycle, the gi_gp_dskewchar_all_detect flag is asserted (or gi_gp_all_com_det by the link initialization unit 308, see FIG. 3). Thus, lane 0, in cycle 6, forwards the buffered COM, rather than the generated SKP, at its output dskw_data[7:0]. The signal gi_gp_dskewchar_all_detect, when asserted, means that all lanes of the link have "seen" the first non-data symbol, such that the rdptr for each lane may now be released from its stall state.

Note that the write pointers for all lanes continue to be incremented in each cycle of lgclk, unless the second non-data signal (here, SKP) is detected at the inlet of the buffer 404. For the PCI Express embodiment, the process looks for the COM at the inlet of the buffer 404 where this COM is not that of a SKP Ordered-Set. The SKP Ordered-Set as explained above is an example of a non-data sequence that is defined under PCI Express as consisting of a single COM followed by a one to five instances of SKP. To illustrate an SKP Ordered-Set, imagine that, in the timing diagram of FIG. 5, DATA 1, DATA 2, and DATA 3 (which are said to "follow" COM) are instead each an instance of the non-data symbol SKP.

The first part of the deskew process, also referred to as deskew using COM for the PCI Express embodiment, results in alignment of the COM in all lanes of a link, by inserting one or more instances of SKP preceding the COM. This can be seen in FIG. 5, by comparing the output deskewed data for lane 0 (dskw_data[7:0]) with the corresponding deskewed output for lane 1. Note how the COMs are aligned in cycle 6 of lgclk, achieved by inserting three instances of SKP that precede the COM, in clock cycles 3-5.

Figure 6A:
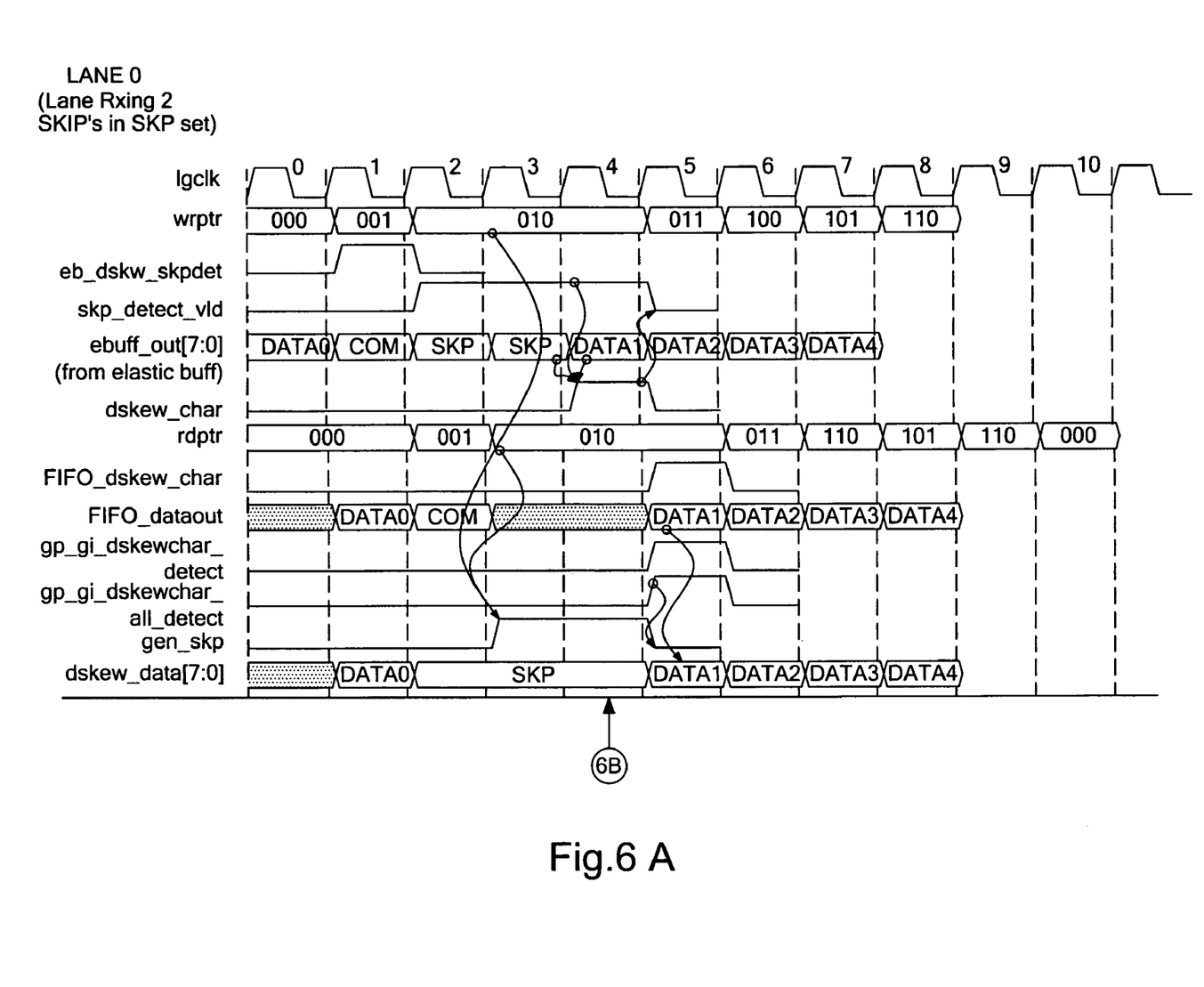
FIGS. 6A-6B show an example timing diagram of another deskew process.
Figure 6B:
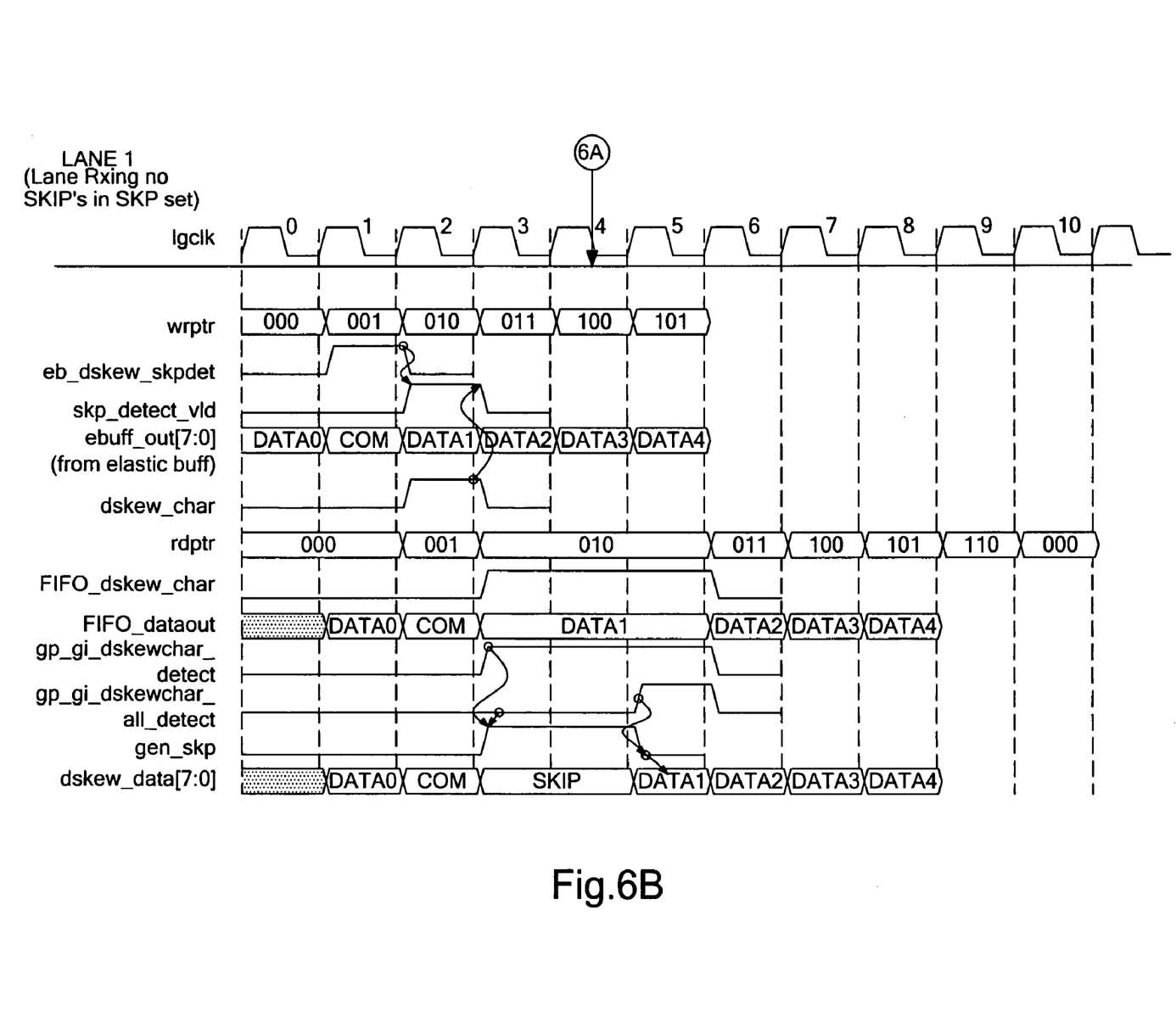

The above described first part of the deskew process (deskew using COM) may be performed during training, prior to initialization of the link. The first part may be followed by the second part, an example of which is illustrated in FIGS. 6A-6B. For the PCI Express embodiment, the second part of the deskew process is also referred to as deskew using SKP. This second part may be performed only when a link initialization unit or some other higher level symbol processing unit asserts a further enable symbol gi_gp_skpdskew_en (see FIGS. 4A-4B). The deskew logic circuitry, as illustrated in FIGS. 4A-4B, for example, now watches for an indication of an instance of the first non-data symbol (e.g., COM) followed by an instance of the second non-data symbol (e.g., SKP). These two symbols are an example of the PCI Express SKP Ordered-Set, although in general other non-data sequences will also work. In the embodiment of FIGS. 4A-4B, this indication is given by the assertion of eb_dskw_skpdet obtained from the EB 234. This indication may also set a flag indicating that an SKP Ordered-Set is being processed. If this flag is set, and a non-SKP data symbol is detected following an SKP, then that would signal the end of the SKP Ordered-Set. See last SKP detect logic 418, which signals when the last SKP in the SKP Ordered-Set has been detected. Meanwhile, the data symbol sequence is loaded into the deskew buffer 404, along with the dskew_char attribute being set. However, in this embodiment, all intermediate SKP symbols, from the start of the SKP Ordered-Set to its end, are not written into the deskew buffer 404.

Turning to the outlet of the deskew buffer 404, if the dskew_char attribute is set, then the read pointer is stalled at its current position (again via control logic 416 and pointer logic 412). This can be seen in the timing diagram of FIG. 6A, for lane 0, where the rdptr has been stalled beginning at clock cycle 4. Also, note how the output of the deskew buffer, that is FIFO_dataout is uncertain in cycles 3 and 4, whereas the output for the lane (dskw_data[7:0]) shows two instances of SKP having been generated. That is because the SKP symbols that appear in cycles 2 and 3, at the outlet of the EB 234, are not written into the deskew buffer 404.

FIG. 6B shows lane 1 which is in this case an example of a lane that has received no instances of SKP in what was an SKP Ordered-Set prior to the elastic buffer, EB 234 (FIG. 2). The non-data sequence in this case consists of a single instance of COM arriving from the elastic buffer (cycle 1). This symbol would nonetheless be considered an SKP Ordered-Set (because it is aligned with the corresponding sequence in lane 0). Accordingly, the ep_dskw_skpdet indication is also set when the COM is received in cycle 1. If an instance of SKP has been detected in other lanes (here lane 0 for example), then the skp_detect_vld indication is set as in cycle 2, signifying that there is at least one SKP that will need to be inserted for the output of lane 1. Accordingly, at the start of cycle 3, an instance of SKP is generated at the output (dskw_data). Additional instances of SKP will continue to be generated for lane 1, so long as the relevant deskew character, in this case the last instance of SKP in the longest Ordered-Set of the link, has not been detected at the inlet of a deskew buffer of any lane of the link. For the example of FIGS. 6A-6B, the gi_gp_dskewchar_all_detect flag is asserted beginning with cycle 5 indicating the end of the longest SKP Ordered-Set. This leads to the read pointer in lane 1 being released with cycle 5, such that the data symbol in the deskew buffer for lane 1 (here, DATA 1) is provided at the output for lane 1. It can be therefore seen that the sequence of symbols DATA 0, COM, SKP, SKP, DATA 1, DATA 2, DATA 3, . . . are all aligned in lane 0 and in lane 1 (as dskw_data).

The following recaps some of the rules for operating the read and write pointers, according to certain embodiments of the invention. With respect to the write pointer, this pointer may be activated, e.g. incremented according to lgclk, as soon as a training sequence has been initiated for the link. The write pointer may be incremented under all circumstances except the following (where the write pointer will hold or be stalled at its present value): a) the second non-data symbol (e.g., SKP) has been detected at the inlet of the corresponding deskew buffer; or b) the link is in the X1 configuration, that is a single lane.

Turning now to the read pointer, this pointer may be activated as soon as the write pointer has been activated. The following are conditions under which the read pointer may not be incremented, that is it is stalled: a) the read pointer is equal to the write pointer (also referred to as pointer collision meaning that the deskew process cannot be performed); b) an indication at the outlet of the deskew buffer that a deskew character or symbol (e.g., COM or SKP) has been detected, but that such a symbol has not been detected in all lanes of the link; or c) the link is in the single lane configuration. Note that the signal gp_gi_dskewchar_detect (FIGS. 5 and 6) is a single signal that may be used to indicate the presence of either type of deskewing character, e.g. either a COM or SKP.

Other System Embodiments

The above-described link interface circuitry and methodology may also be implemented in IC devices that are designed to communicate via a serial, point to point interconnect technology that provides isochronous support for multimedia. Isochronous support is a specific type of QoS (Quality of Service) guarantee that data is delivered using a deterministic and time-dependent method. Platform-based isochronous support relies on a documented system design methodology that allows an application that requires a constant or dedicated level of access to system resources to gain the required bandwidth at a given time interval.

Figure 7:
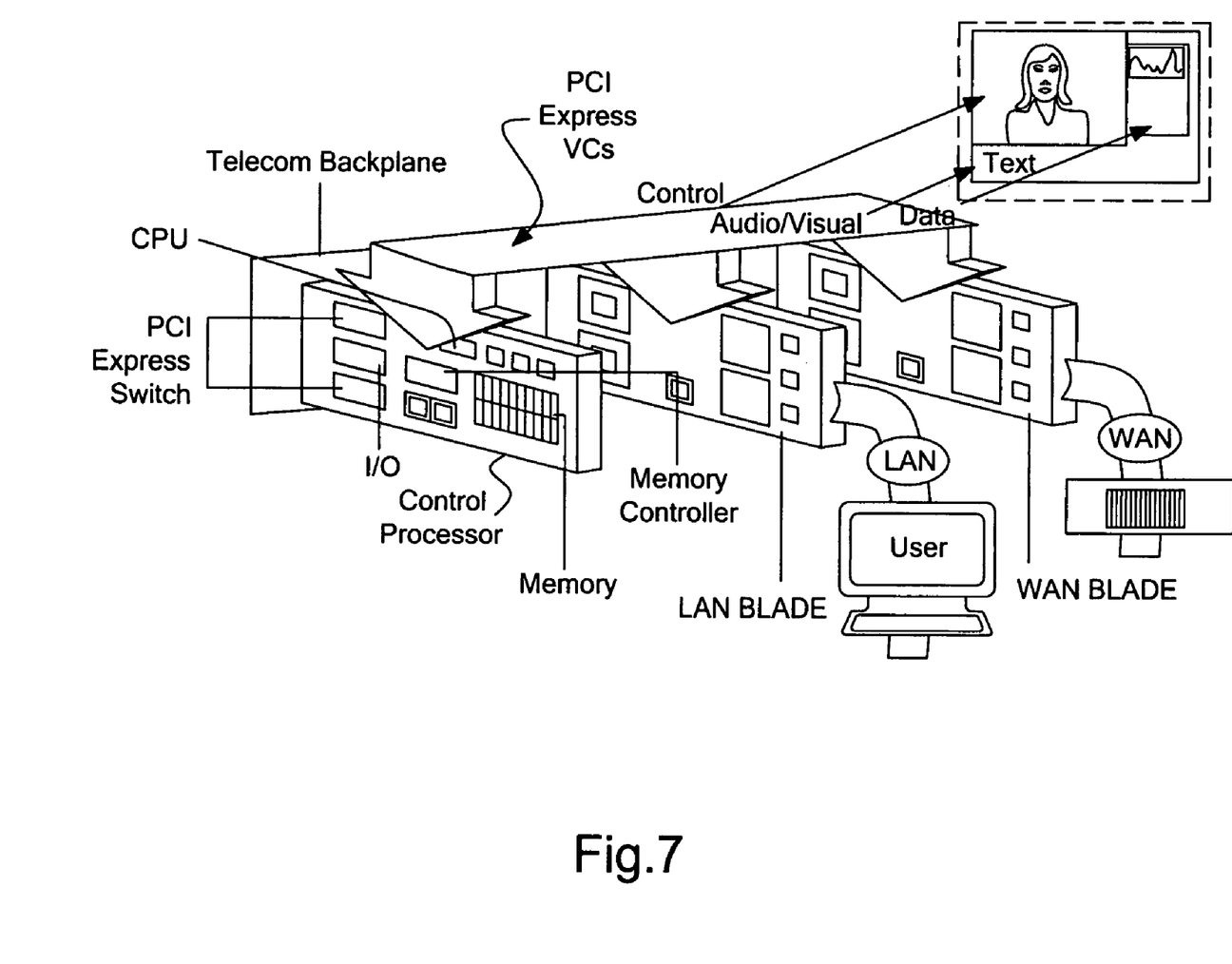
FIG. 7 identifies the various elements of a multi-media desktop personal computer some of which are communicationally coupled to each other via PCI Express virtual channels (VCs).

An example is that of watching an employee broadcast that originates from the company's CEO, on a desktop while working on a report, as shown in FIG. 7. Data is routed from the intranet into the desktop main memory where the application utilizes the data to create an audio stream sent to the user's headphones via an add-in card and a video stream sent to the display via a graphics controller. If simultaneous operations are occurring within the desktop personal computer (PC), such as disk reads, data coming off the Internet, word processing, email, and so on, there is no guarantee that the audio and video stream will be truly glitchless. Data is delivered on a "best effort" method only. The user may experience skips or stalls as applications compete for the same resources. Isochrony in PCI Express solves this problem by establishing a mechanism to guarantee that time-sensitive applications are able to secure adequate system resources. For example, in FIG. 7, the video time-sensitive data would be guaranteed adequate bandwidth to prevent skips at the expense of non-critical data such as email.

The above-described link interface circuitry and methodology may also be implemented in IC devices that are designed to communicate via a serial point to point link technology that is used in communications equipment, from embedded applications to chassis-based switching systems. In advanced switching, mechanisms are provided to send packets peer-to-peer through the switch fabric. These markets also benefit from the server class hardware-based error detection that is available with PCI Express. There may be two main types of usages within communications equipment, control plane processing and data plane processing. Control plane refers to the control and configuration of the system. The serial link may be used as the interface to configure and control processors and cards within a large number of systems. Chassis-based building switches typically have various cards that can be inserted and used. Chassis-based switches may offer field-upgradeability. Most switching systems offer the ability to only populate half of the chassis initially and add cards with additional ports or faster speed connections as demand or the number of users increase. The serial link technology could be used as a control plane interconnect to configure and monitor the different types of cards installed within the system. The enumeration and established configuration protocol within PCI Express, for example, lends itself to a low pin count, high bandwidth interface to configure cards and services.

The data plane refers to the actual path that the data flows. In the data plane, an advanced switching extension may define mechanisms to encapsulate and send PCI Express data packets across peer-to-peer links through the switch fabric.

The PCI Express core architecture may provide a solid foundation for meeting new interconnect needs. The Advanced Switching (AS) architecture overlays on this core and establishes an efficient, scalable, and extensible switch fabric through the use of a specific AS header inserted in front of the PCI Express data packet at the Transaction Layer. AS switches only examine the contents of the header that provide routing information (where to send the packet), traffic class ID (quality of service information), congestion avoidance (for preventing traffic jams), packet size, and protocol encapsulation. By separating the routing information, switch designs are simpler and cost-effective. Additionally, adding an external header to the packet enables the switch fabric to encapsulate any number of existing protocols.

Figure 8:
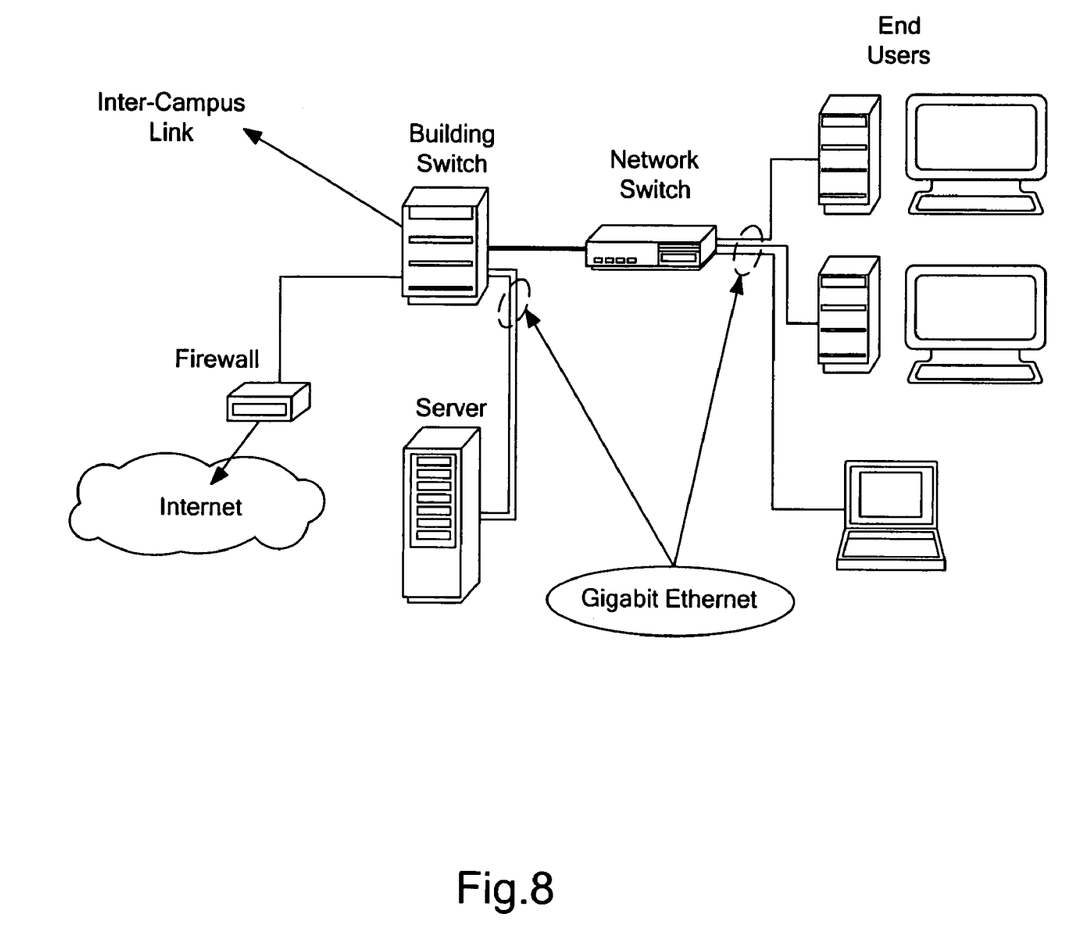
FIG. 8 depicts a block diagram of an enterprise network.

The above-described link interface circuitry and methodology may also be implemented in IC devices that are designed to communicate via a serial point to point interconnect technology that is used for network connections (in place of Gigabit Ethernet, for example). The network connection may be for corporate mobile and desktop computers for sharing files, sending emails, and browsing the Internet. Servers as well as communications equipment may be expected to implement such network connections. An example of such a network connection within the enterprise network is shown in FIG. 8.

Although the above examples may describe embodiments of the invention in the context of combinational and sequential logic circuits, other embodiments of the invention can be implemented by way of software. For example, some embodiments may be provided as a computer program product or software which may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that features an embodiment of the invention.

To summarize, various embodiments of a method and apparatus for lane to lane deskewing of a serial point to point link have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, although the system embodiment has been described using the serial point to point link as a chip to chip connection between two devices on a printed wiring board such as in a desktop, server, or notebook computer, the deskewing technique may also be used with serial point to point links that are part of an external bus for connecting the computer to a peripheral such as a keyboard, monitor, external mass storage device, or camera. The point to point link may be used in not only computer systems, but also dedicated communications products such as mobile phone units, telecommunication switches, and data network routers. The specification and drawings are, accordingly, to be regarded in an illustrative rather than a restrictive sense.

What is claimed is:

1. An integrated circuit (IC) device comprising:
an elastic buffer having an input to receive a plurality of symbol sequences that were transmitted by another IC device over a serial point to point link, the elastic buffer to provide a plurality of buffered symbol sequences; and
deskew circuitry having an input coupled to an output of the elastic buffer, the deskew circuitry to forward the plurality of buffered symbol sequences with reduced skew in response to an enable control signal being asserted, the deskew circuitry includes
a plurality of deskew buffers,
write pointer logic to load the plurality of buffered symbol sequences into the plurality of deskew buffers,
read pointer logic to provide a plurality of read pointers to unload the plurality of buffered symbol sequences from the plurality of deskew buffers, and
control logic having an output coupled to the read pointer logic, the control logic to, in response to the first instance of a first, predetermined non-data symbol appearing at an output of one of the plurality of deskew buffers since the enable control signal was asserted, a) stall the read pointer for said deskew buffer, and b) generate an instance of a second, different predetermined non-data symbol at an output of the deskew circuitry through which the buffered symbol sequence for said deskew buffer is forwarded.

2. The IC device of claim 1 wherein the read pointer is to be stalled at an entry that contains an instance of the first non-data symbol.

3. The IC device of claim 1 wherein the control logic is to a) release the read pointer and b) stop generating instances of the second predetermined non-data symbol, if an instance of the first predetermined non-data symbol has appeared at an output of every one of the plurality of deskew buffers.

4. The IC device of claim 3 wherein the control logic is to, in response to detecting that a first instance of the first non-data symbol is followed by an instance of the second non-data symbol that are to be loaded into one of the plurality of deskew buffers, a) stall the read pointer for another one of the plurality of deskew buffers after having loaded a second instance of the first non-data symbol that is clock aligned with the first instance, and b) generate an instance of the second non-data symbol at an output of the deskew circuitry through which the buffered symbol sequence for said another deskew buffer is forwarded while preventing said instance of the second non-data symbol, that was detected, from being loaded into said one of the plurality of deskew buffers.

5. The IC device of claim 4 wherein the read pointer is to be stalled for said another deskew buffer at an entry that contains a data symbol.

6. The IC device of claim 1 wherein the first non-data symbol is a PCI Express COM and the second non-data symbol is a PCI Express SKP.

7. A system comprising:
a processor;
a main memory; and
an integrated circuit (IC) device which is communicatively coupled to the processor and the main memory and provides the processor with I/O access, the IC device having link interface circuitry that supports a serial, point to point link, the circuitry includes
an elastic buffer having an input to receive a plurality of symbol sequences that were transmitted by another device over the serial point to point link, the elastic buffer to provide a plurality of buffered symbol sequences, and
deskew circuitry having an input coupled to an output of the elastic buffer, the deskew circuitry to forward the plurality of buffered symbol sequences with reduced skew in response to an enable control signal being asserted, the deskew logic includes
a plurality of deskew buffers,
write pointer logic to load the plurality of buffered symbol sequences into the plurality of deskew buffers,
read pointer logic to provide a plurality of read pointers to unload the plurality of buffered symbol sequences from the plurality of deskew buffers, and
control logic having an output coupled to the read pointer logic, the control logic to, in response to the first instance of a first, predetermined non-data symbol appearing at an output of one of the plurality of deskew buffers since the enable control signal was asserted, a) stall the read pointer for said deskew buffer, and b) generate an instance of a second, different predetermined non-data symbol at an output of the deskew circuitry through which the buffered symbol sequence for said deskew buffer is forwarded.

8. The system of claim 7 wherein the read pointer is to be stalled at an entry that contains an instance of the first non-data symbol.

9. The system of claim 8 wherein the control logic is to a) release the read pointer and b) stop generating instances of the second predetermined non-data symbol, if an instance of the first predetermined non-data symbol has appeared at an output of every one of the plurality of deskew buffers.

10. The system of claim 7 wherein the control logic is to a) release the read pointer and b) stop generating instances of the second predetermined non-data symbol, if an instance of the first predetermined non-data symbol has appeared at an output of every one of the plurality of deskew buffers.

11. The system of claim 10 wherein the control logic is to, in response to an indication that a predetermined non-data symbol sequence is about to be loaded into one of the plurality of deskew buffers, stall the read pointer for another one of the plurality of deskew buffers and generate an instance of the second non-data symbol at an output of the deskew logic through which the buffered symbol sequence for said another deskew buffer is forwarded.

12. The system of claim 11 wherein the read pointer is to be stalled for said another deskew buffer an entry that contains a data symbol.

13. The system of claim 7 wherein the first non-data symbol is a PCI Express COM and the second non-data symbol is a PCI Express SKIP.

14. The system of claim 7 further comprising a graphics element; and
   wherein the IC device is a memory controller hub (MCH) that communicatively couples the processor to the main memory and the graphics element.

15. The system of claim 7 wherein the IC device is an I/O controller hub that communicatively couples the processor to peripheral devices.

16. The system of claim 11 wherein the predetermined non-data symbol sequence includes an instance of the first non-data symbol followed by an instance of the second non-data symbol, the instance of the first symbol but not the second symbol being loaded into said one of the plurality of deskew buffers.

17. The IC device of claim 1 wherein the instance of the second, different predetermined non-data symbol is generated immediately preceding an instance of the first non-data symbol.

18. The IC device of claim 1 wherein the instance of the second, different predetermined non-data symbol is inserted only at the output of the deskew circuitry.

19. The system of claim 7 wherein the instance of the second, different predetermined non-data symbol is generated immediately preceding an instance of the first non-data symbol.

20. The system of claim 7 wherein the instance of the second, different predetermined non-data symbol is inserted only at the output of the deskew circuitry.

21. The IC device of claim 1 further comprising a plurality of IC devices having an input, wherein a plurality of instances of the second, different predetermined non-data symbol are inserted at an output of the deskew circuitry of at least one, but fewer than all of, the plurality of IC devices.

22. The system of claim 7 further comprising a plurality of IC devices coupled to the processor, wherein a plurality of instances of the second, different predetermined non-data symbol are inserted at an output of the deskew circuitry of at least one, but fewer than all of, the plurality of IC devices.

* * * * *

UNITED STATES PATENT AND TRADEMARK OFFICE
CERTIFICATE OF CORRECTION

| | |
|---|---|
| PATENT NO. | : 7,631,118 B2 |
| APPLICATION NO. | : 10/749721 |
| DATED | : December 8, 2009 |
| INVENTOR(S) | : Renaud et al. |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1723 days.

In column 12, at line 67 delete, "SKIP" and insert --SKP--.

Signed and Sealed this

Seventeenth Day of August, 2010

David J. Kappos
*Director of the United States Patent and Trademark Office*